United States Patent
Auerbach et al.

(10) Patent No.: US 7,333,976 B1
(45) Date of Patent: Feb. 19, 2008

(54) METHODS AND SYSTEMS FOR PROCESSING CONTACT INFORMATION

(75) Inventors: David Benjamin Auerbach, Brooklyn, NY (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 425 days.

(21) Appl. No.: 10/813,838

(22) Filed: Mar. 31, 2004

(51) Int. Cl.
G08F 7/00 (2006.01)

(52) U.S. Cl. .............................................. 707/3; 707/4

(58) Field of Classification Search ............ 707/103 R, 707/1–10
See application file for complete search history.

(56) References Cited

U.S. PATENT DOCUMENTS

| | | |
|---|---|---|
| 5,280,612 A | 1/1994 | Lorie et al. |
| 5,555,346 A | 9/1996 | Gross et al. |
| 5,701,469 A | 12/1997 | Brandli et al. |
| 5,742,816 A * | 4/1998 | Barr et al. ..................... 707/3 |
| 5,748,954 A | 5/1998 | Mauldin |
| 5,881,315 A | 3/1999 | Cohen |
| 5,907,836 A | 5/1999 | Sumita et al. |
| 5,961,610 A | 10/1999 | Kelly et al. |
| 5,964,839 A | 10/1999 | Johnson et al. |
| 6,006,222 A | 12/1999 | Culliss |
| 6,014,665 A | 1/2000 | Culliss |
| 6,078,916 A | 6/2000 | Culliss |
| 6,119,147 A | 9/2000 | Toomey et al. |
| 6,182,068 B1 | 1/2001 | Culliss |
| 6,199,067 B1 | 3/2001 | Geller |
| 6,240,548 B1 | 5/2001 | Holzle et al. |
| 6,275,820 B1 | 8/2001 | Navin-Chandra et al. |
| 6,275,957 B1 | 8/2001 | Novik et al. |
| 6,282,548 B1 | 8/2001 | Burner et al. |
| 6,341,371 B1 | 1/2002 | Tandri |
| 6,446,076 B1 | 9/2002 | Burkey et al. |
| 6,477,585 B1 | 11/2002 | Cohen et al. |
| 6,513,036 B2 | 1/2003 | Fruensgaard et al. |
| 6,526,405 B1 | 2/2003 | Mannila et al. |
| 6,532,023 B1 | 3/2003 | Schumacher et al. |
| 6,581,056 B1 | 6/2003 | Rao |
| 6,658,423 B1 | 12/2003 | Pugh et al. |
| 6,681,247 B1 | 1/2004 | Payton |
| 6,779,030 B1 | 8/2004 | Dugan et al. |
| 6,826,553 B1 | 11/2004 | DaCosta et al. |
| 6,853,950 B1 | 2/2005 | O-Reilly et al. |
| 6,934,740 B1 | 8/2005 | Lawande et al. |
| 6,963,830 B1 | 11/2005 | Nakao |
| 6,981,040 B1 | 12/2005 | Konig et al. |

(Continued)

OTHER PUBLICATIONS

U.S. Appl. No. 10/749,440, filed Dec. 31, 2003, Badros et al.

(Continued)

*Primary Examiner*—Wilson Lee
(74) *Attorney, Agent, or Firm*—Fenwick & West LLP (57) ABSTRACT

Systems and methods for processing contact information are described. In one embodiment, an entity name is identified from an event associated with an article, wherein the entity name is associated with an entity and the event is associated with a user, contact information associated with the entity name is identified, the entity name and at least some of the contact information is indexed, and the entity name and at least some of the contact information is stored.

46 Claims, 3 Drawing Sheets

U.S. PATENT DOCUMENTS

| | | | |
|---|---|---|---|
| 7,016,919 | B2 | 3/2006 | Cotton et al. |
| 7,080,073 | B1 | 7/2006 | Jiang et al. |
| 7,099,887 | B2* | 8/2006 | Hoth et al. ............. 707/103 R |
| 7,162,473 | B2 | 1/2007 | Dumais et al. |
| 2002/0059425 | A1 | 5/2002 | Belfiore et al. |
| 2002/0065802 | A1 | 5/2002 | Uchiyama |
| 2002/0073076 | A1 | 6/2002 | Xu et al. |
| 2002/0091568 | A1 | 7/2002 | Kraft et al. |
| 2002/0091972 | A1 | 7/2002 | Harris et al. |
| 2002/0103664 | A1 | 8/2002 | Olsson et al. |
| 2002/0116291 | A1 | 8/2002 | Grasso et al. |
| 2002/0174101 | A1 | 11/2002 | Fernley et al. |
| 2002/0178383 | A1 | 11/2002 | Hrabik et al. |
| 2003/0001854 | A1 | 1/2003 | Jade et al. |
| 2003/0018521 | A1 | 1/2003 | Kraft et al. |
| 2003/0028896 | A1 | 2/2003 | Swart et al. |
| 2003/0050909 | A1 | 3/2003 | Preda et al. |
| 2003/0055816 | A1 | 3/2003 | Paine et al. |
| 2003/0088433 | A1 | 5/2003 | Young et al. |
| 2003/0123443 | A1 | 7/2003 | Anwar |
| 2003/0131000 | A1 | 7/2003 | Bates et al. |
| 2003/0149694 | A1 | 8/2003 | Ma et al. |
| 2003/0154071 | A1 | 8/2003 | Shreve |
| 2003/0167266 | A1 | 9/2003 | Saldanha et al. |
| 2004/0031027 | A1 | 2/2004 | Hiltgen |
| 2004/0128285 | A1 | 7/2004 | Green et al. |
| 2004/0133561 | A1* | 7/2004 | Burke ........................... 707/3 |
| 2004/0143569 | A1* | 7/2004 | Gross et al. .................... 707/3 |
| 2004/0187075 | A1 | 9/2004 | Maxham et al. |
| 2004/0193596 | A1 | 9/2004 | Defelice et al. |
| 2004/0254938 | A1 | 12/2004 | Marcjan et al. |
| 2004/0255301 | A1 | 12/2004 | Turski et al. |
| 2004/0267700 | A1 | 12/2004 | Dumais et al. |
| 2005/0021542 | A1 | 1/2005 | Irie et al. |
| 2005/0033803 | A1 | 2/2005 | Vleet et al. |
| 2005/0076115 | A1 | 4/2005 | Andrews et al. |
| 2005/0114487 | A1 | 5/2005 | Peng et al. |
| 2005/0262073 | A1 | 11/2005 | Reed et al. |
| 2007/0055689 | A1 | 3/2007 | Rhoads et al. |

OTHER PUBLICATIONS 80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web," IBM Research, http://www.almaden.ibm.com/cs/wbi/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://www7.scu.edu.au/programme/fullpapers/1921/com1921.htm, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.devon-techonologies.com/products/devonthink.php, printed Mar. 16, 2004.
dtSearch® -http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher: A Tour Guide for the World Wide Web," 1996.
Markoff, J., "Google Moves Toward Clash with Microsoft," *The New York Times*, May 19, 2004, http://www.nytimes.com/2004/5/19/technology/19google.html?ex=1085964389&ei=1&e.... pp. 1-4, printed May 19, 2004.
Naraine, R., "Future of Search Will Make You Dizzy," Enterprise, May 20, 2004, http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . , pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.
"Selecting Task-Relevant Sources for Just-In-Time Retrieval," pp. 1-3, no date.
Sherman, C., "HotBot's New Desktop Search Toolbar," www.searchenginewatch.com, http://searchenginewatch.com/searchday/print.php/34711_339921, pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page,"Welcome to the WebWatcher Project," http://www-2.cs.cmu.edu/-webwatcher/, printed Oct. 15, 2003.
"WhenU Just-In-Time Marketing," http://www.whenu.com, printed Mar. 19 2004.
X1 instantly searches files & email. For outlook, Outlook, http://www.x1.com/, printed Mar. 15, 2004.
Zellweger, P., et al., "Fluid Links for Informed and Incremental LInk Transitions," Proceedings of Hypertext'98, Pittsburgh, PA, Jun. 20-24, 1998, pp. 50-57.
U.S. Appl. No. 10/814,773, filed Mar. 31, 2004, Lawrence et al.
"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.
Knezevic, P. et al., "The Architecture Of The Obelix—An Improved Internet Search Engine," Proceedings of the 33rd Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet:<URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

* cited by examiner

METHODS AND SYSTEMS FOR PROCESSING CONTACT INFORMATION

FIELD OF THE INVENTION

The invention generally relates to search engines. More particularly, the invention relates to methods and systems for processing contact information.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for processing contact information. In one embodiment, an entity name is identified from an event associated with an article, wherein the entity name is associated with an entity and the event is associated with a user, contact information associated with the entity name is identified, the entity name and at least some of the contact information is indexed, and the entity name and at least some of the contact information is stored. Additionally, a search query relating to the entity name is received, at least some of the contact information as relevant to the query is identified, and at least some of the contact information is output.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Overview

Certain embodiments provide methods and systems for processing contact information. For example, one embodiment can identify entities such as persons, organizations, businesses, or corporations. One embodiment can further identify contact information, such as email addresses, addresses, telephone numbers, and fax numbers, for example, associated with the entities.

System Description

Figure 1:
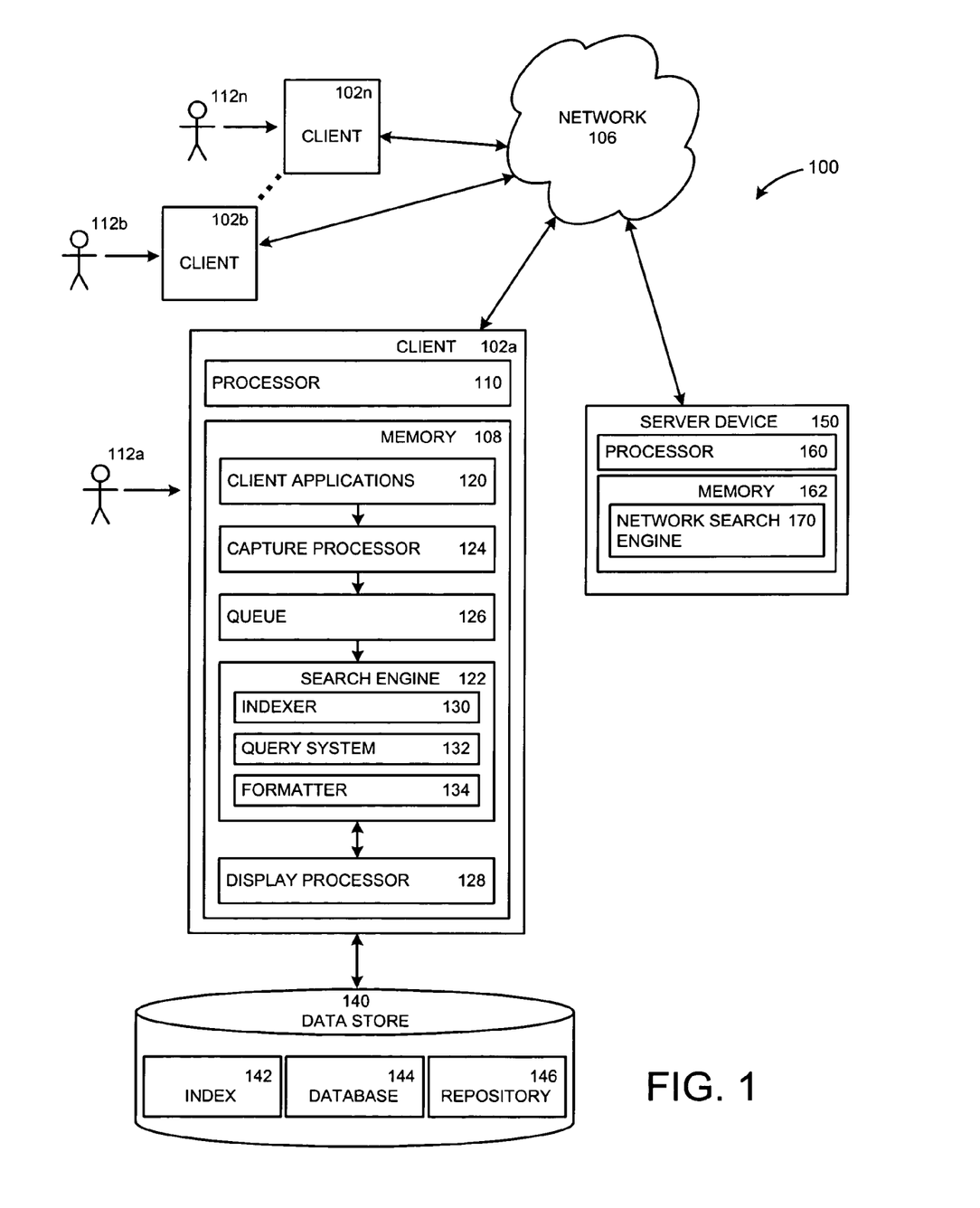
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an email message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the receipt of an email message by the user 112a can comprise the sender of the message, the recipients of the message, the time and date the message was received, and the content of the message.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an instant messenger message event sent by the user 112a can include a recipient or list of recipients, the time sent, the date sent, content of the message, and a conversation ID. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. The importance may be measured by a capture score associated with and/or determined for the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126, how detailed the events are that are sent (fewer or smaller events when the system is busy), or how frequently events are sent (events are sent less often when the system is busy or there are already too many events waiting to be processed). The search engine 122 can use performance data to determine when it indexes various events and when and how often it issues implicit queries.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

The indexer 130 can send and incorporate the terms and times, associated with the event in the index 142 of the data store 140. The event can be sent to the database 144 for storage and the content of the associated article and any associated images can be stored in the repository 146. Contact information for any identified entities can also be stored in the repository 146.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a The result set can also comprise contact information for entities relevant to the search query.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VB, JAVA, or NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102*a* via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102*a-n*, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102*a*. The search engine 170 then can provide a result set to the client device 102*a* via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102*a* is a stand alone device and is not coupled to a network. The system 100 shown in FIG. 1 is merely exemplary, and is used to explain the exemplary methods shown in FIGS. 2 through 3.

Various methods in accordance with embodiments of the present invention may be carried out. For example, in one embodiment, method can comprise identifying an entity name from an event associated with an article; identifying contact information associated with the entity name; indexing the entity name and at least some of the contact information; and storing the entity name and at least some of the contact information. According to another embodiment, the entity ID can be associated with the entity name. According to another embodiment, the entity ID can be the same as the entity name. According to another embodiment, the entity ID can be a preexisting entity ID if the entity name has previously been identified. According to another embodiment, the contact information can be indexed if the entity name is associated with or related to the user. According to another embodiment, the entity name can be identified as being associated with the user based at least in part on user activity. According to another embodiment, the contact information can be indexed if the user provides authorization. According to another embodiment, the article can comprise a document associated with a client application. According to another embodiment, the article can comprise one of an email, a word processing document, a spreadsheet document, a drawing, a programming application document, a presentation application document, a web page, an mp3, an image, or a media file document. According to another embodiment, the contact information can comprise one or more of one or more names, one or more addresses, one or more telephone numbers, one or more facsimile numbers, one or more email addresses, and one or more website addresses.

According to another embodiment, the method can comprise receiving a search query relating to the entity name; identifying at least some of the contact information as relevant to the query; and outputting at least some of the contact information. According to another embodiment, the method can further comprise associating contact information from multiple events with the entity name. According to another embodiment, associating contact information from multiple events with the entity name can comprise determining at least one common identifier. According to another embodiment, less than all of the multiple events can share a same common identifier. According to another embodiment, associating contact information from multiple events with the entity name can comprise determining patterns or redundant identifiers. According to another embodiment, identifying the entity name can comprise one or more of determining a list, capital letter, field, formatting, typical value, or parsing encoded information. According to another embodiment, identifying contact information can further comprise determining one or more of a field, header tag, context in which text appears, matching entries, or parsed article content.

According to another embodiment, a method can further comprise causing the output of contact information in connection with one or more of a pop-up window, possible alternative contact information, a probability of correct contact information, a link, search results, or an event.

Figure 2:
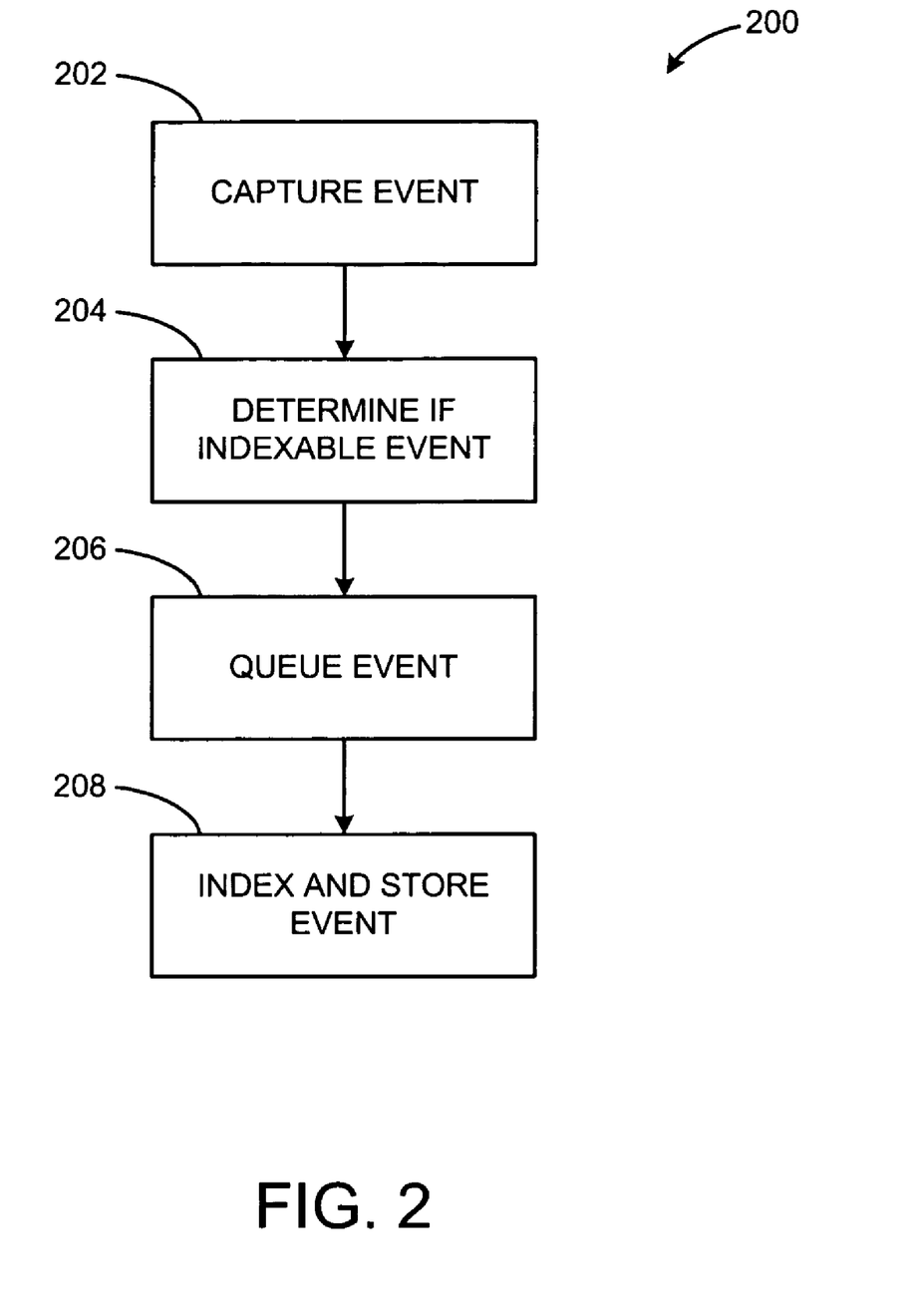
FIG. 2 is a flow diagram illustrating an exemplary method of capturing and processing event data associated with a client device in one embodiment of the present invention.

FIG. 2 illustrates an exemplary method 200 that provides a method for capturing and processing an event. This exemplary method is provided by way of example, as it will be appreciated from the foregoing description of exemplary embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The event can be a real-time event or can be a historical event. The capture processor 124 can capture a real-time event by identifying and compiling event data associated with the event upon the occurrence of the event. The capture processor 124 can capture a historical event, for example, by periodically crawling the memory 108 or associated data storage device of the client device 112*a* for previously uncaptured articles or receiving articles or data from client applications and identifying and compiling event data associated with the event. The capture processor 124 may have separate capture components for each client application, network monitoring, performance data capture, keystroke capture, and display capture.

In one embodiment, the capture component can use a generalized event definition mechanism, such as an event schema that it has previously defined and registered with the client device 102*a*, to capture or express the event. Based on the event schema, the capture processor 124 can compile event data for the event. For example, event data compiled for an email event can include the sender, other recipients, the time sent, the date sent, and the content of the message. Event data compiled for a web page currently being viewed by a user can include the Uniform Resource Locator or URL of the web page, the time being viewed, and the content of the web page. Event data compiled for a word processing document being saved by a user can include the title of the document, the time saved, the location of the document, the format of the document, the text of the document, and the location of the document.

In 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed or sent for storage by the indexer 130. Indexable events can be indexable real-time events or historical events. For example, receiving an email, saving a word processing document, viewing a web page can all be indexable events.

If an indexable event is determined, then, in 206, the event can be sent by the capture processor 124 to the queue 126 with an indication that it is an indexable event. In the embodiment shown, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, in 206, the non-indexable event can be sent by the capture processor 124 to the user state queue of the queue 126 with an indication that it is not to be indexed.

In one embodiment, the queue 126 holds the event until the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. In another embodiment, a queue is not used and events are sent directly to the search engine 122 from the capture processor 124.

In 208, the indexer 130 indexes and stores the event. The indexer 130 can retrieve an event from the queue 126 when it is ready to process the event. In one embodiment, the indexer 130 determines if the event is a duplicate event and if not assigns an Event ID to the event. The indexer 130 can also associate the event with related events. In the embodiment shown in FIG. 2, the indexer determines indexable terms associated with the event, dates and times associated with the event, and other event data compiled for the event based on the event schema. The indexer 130 can associate the Event ID with the indexable terms that are contained in the index 142. The event can be stored in the database 144 and the content of the event can be stored in the repository 146.

Figure 3:
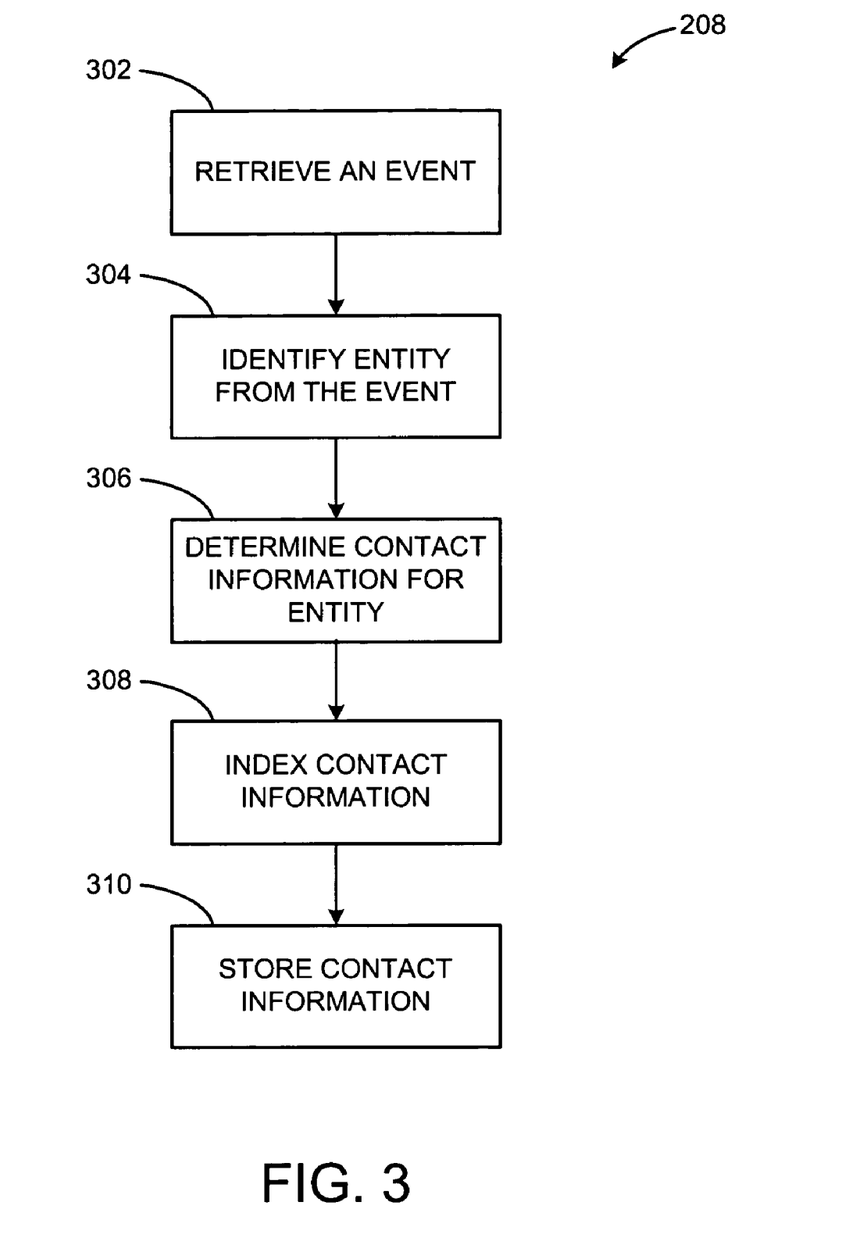
FIG. 3 is a flow diagram illustrating an exemplary method of processing contact information in one embodiment of the present invention.

FIG. 3 illustrates an exemplary method 208 for indexing and storing contact information associated with an event. In 302, the indexer 130 retrieves an event from the queue 126. In 304, an entity relating to the event can be identified. The indexer 130 can parse out indexable terms from the event and identify entity names from the indexable terms. An entity name can represent an entity such as a person, organization, business, or corporation. In one embodiment, the indexer can identify entity names by comparing the indexed terms from the event with a list of known entity names. In one embodiment, the list of known entity names can be compiled based in part on the user's past interaction or activity associated with the entities and can be stored in the repository 146. Other signals can be used to identify entity names. For example, for an email event, an email address or name associated with an email address can be identified. For a word processing document, such as a letter or memorandum, text in the first line of the address field or to field can be assumed to be an entity name. Other signals, such as capitalized words, can be used to identify entity names. In another embodiment, the indexer 130 can scan web pages for address fields, access address listings such as, for example an address book on the client 102*a*, determine the URL of a website and compare the URL to a list of known address book URLs, or match other text in an article for known entries in a contact list and append to the existing contact. The indexer 130 can further recognize street addresses, zip codes, phone numbers, etc. based on their format and typical values. For example, the indexer can recognize that numbers of the form ###-###-#### typically represent phone numbers within the United States. Additionally, the indexer 130 can determine contact information by determining parsed article content on the network 106. For example, the indexer 130 can determine passed article content on a web page by parsing encoded contact information appearing in special formats such as, for example, a vCard.

In one embodiment, the indexer 130 assigns an entity ID to each identified entity name. The indexer 130 can assign a predetermined entity ID to the entity name, if the entity name has been identified previously. The indexer 130 can assign a new entity ID to the entity name, if the entity name has not previously been identified.

In 306, contact information associated with the entity name can be determined. The indexer 130 can determine from the parsed terms of the event whether any contact information for the entity is associated with the event. Contact information can include email address, instant messenger address, telephone number, physical address, URL, and any other suitable contact information. Contact information can be determined based on the location of the data in the article associated with the event and/or the structure of the data. For example, for an email event, an email address can be compiled in the to, from or copy field of an email event based on the associated event schema and can thus be identified as an email address. If the field in which the email address was identified also includes an entity name, then the email address and entity name can be associated. If the body of the email contains a ten digit number, then this number can be identified as a telephone number and associated with the identified entity name. Additionally, if the body of the email contains a signature portion containing an entity name and contact information, this contact information can be associated with the entity name. Similarly, in a word processing document, such as a letter, the address field can be identified and associated with an entity name from the first line of the address field.

Moreover, the indexer 130 can determine contact information and/or associate the contact information with an entity based on common identifiers. Common identifiers can comprise, for example, matching pieces of contact information appearing in different articles. According to some embodiments, the pieces of contact information can be matched based on a shared value. For example, events can contain only partial contact information. Event A, for example, may contain an email address for a person or entity along with additional contact information such as, for example, a street address, phone number, etc., while event B may contain only the email address for the person or entity. According to one embodiment, the additional contact information (street address, phone number, etc.) identified from event A can be displayed along with the email address for event B. Thus, missing contact information in event B can be filled in from event A, based on a match of the email address. Other fields may be used to determine a match, such as a phone number, address, zip code, or other suitable information.

In another embodiment, the indexer 130 can group contact information for a person or entity identified by determining common identifiers based, for example, on multiple events. For example, event A may contain an email address for person X along with a phone number for person X, while event B may contain an email address for person X and a street address for person X. The indexer 130 can use the common identifier of the email address, for example, to associate both the phone number and street address with the email address and the person X. Thus, according to one embodiment, the indexer 130 can display the email address, the street address, and the phone number in response to requests for events A or B. Additionally, any event containing the email address, street address, or phone number obtained from any source may be associated with related events. Hence, the indexer 130 is able to identify more comprehensive contact information by using common identifiers to combine information obtained from multiple events.

According to other embodiments, the indexer 130 can determine contact information from multiple events when one or more of the multiple events does not contain a same common identifier. For example, event A may contain an email address and phone number for person X, event B may contain a phone number and fax number for person X, and event C may contain a fax number and street address for person X. In this example, no single common identifier, or piece of contact information, is contained in all of events A, B, and C. However, the indexer 130 can match the phone number from events A and B, which links the email address and fax number with the phone number, and the indexer 130 can match the fax number from events B and C, which can then be linked with the email address and phone number, thus matching all information by identifying common shared identifiers (phone number and fax number in this case) in the groups.

According to other embodiments, the indexer 130 can determine contact information and/or associate contact information with an entity by determining context in which text appears. For example, the indexer 130 can identify words and numbers comprising an address by identifying, for example, that the words "shipping address," appear immediately to the left of the words and numbers. Of course many other examples of identifying context are possible within the scope of various embodiments. Additionally, the indexer 130 can determine contact information and/or associate contact information with an entity by determining header tags or HTML content. For example, a web pages can be an Inbox for an Internet mail service such as, for example, Yahoo Mail™, and can be identified based in part on header tags within the web page. Header tags can comprise, for example, a From: and CC: field. The fields can be determined, for example, by parsing the HTML, or using formats such as an "<email>" tag to identify particular types of information. In other embodiments, the indexer 130 can determine contact information and/or associate the contact information with an entity based on redundant identifiers. Redundant identifiers can comprise, for example, same or similar pieces of contact information occurring multiple times in different articles. Redundant identifiers may be used to increase the certainty that a piece of contact information is associated with a correct entity. For example, an single event can contain both an email address and a phone number. The email address and phone number may belong to the same person, or they may not. For example, the event may have contained text such as "You can contact person X at (212) 111 1111, and you can contact person Y at y@website.com" The indexer 130 can identify that person X is associated with the phone number and person Y is associated with the email address, for example by determining that the names and pieces of contact information are close to each other in the text. In other situations, another method for determining correct contact information for an entity may be used. For example, an event can contain text such as "You can contact person X at (212) 111 1111, person Y at y@website.com". In this example, the phone number is associated with person X and the email address is associated with person Y. Because the two names are both adjacent to the contact information, the indexer 130 can use patterns to analyze the text to identify which entities relate to which pieces of contact information. Patterns can comprise, for example, common schemes for representing contact information and entity names. For example, in the text above, a pattern "entity X at Y" can be used to identify that X is associated with Y. Common location patterns for contact information can also be used to identify related items with high reliability. For example, a common location of a signature section of an email address often has contact information where a name, phone number, etc. are one after the other.

The indexer 130 can further determine contact information and/or associate the contact information with an entity based on redundant identifiers by determining multiple occurrences. For example, one event may contain text which could initially incorrectly lead the indexer 130 to determine person Y is associated with a certain phone number, as in the example above where the person Y appears adjacent to the phone number. According to some embodiments, the indexer 130 can determine other events containing an identifier for person Y to verify the contact information. The indexer 130 can determine a probability of correct contact information. A probability of correct contact information can represent the likelihood that the contact information is correctly associated with the entity and can be based, for example, on the co-occurrence and proximity of contact information with the identifier for person Y in the other events. For example, eight events may contain the text "person Y, phone (212) 222 2222, fax (212) 222 2223" while two other events contain the text above. Based on the larger number of events containing person Y next to (212) 222

2222, the indexer 130 can conclude that this is the most likely phone number for person Y.

Alternatively, the indexer 130 can access a Lightweight Directory Access Protocol server (LDAP) to determine contact information for an identified entity. For example, the user can be an employee of an organization that has an LDAP containing contact information for employees of the organization. Upon determining an entity name, if the entity is an employee of the organization or the LDAP otherwise contains the entity's contact information, the indexer 130 can access the LDAP and determine contact information relating to the entity.

According to other embodiments, the indexer 130 can determine contact information and/or associate the contact information with an entity by performing a search on a search engine application to obtain additional contact information. For example, given one or more pieces of contact information, a search can be conducted at a web site containing a database of contact information, which can return additional contact information. Additionally, web searches and web crawling may also be used to identify associated contact information. For example, given an email address, the indexer 130 may automatically search web search engines for the email address, or may crawl web sites for the email address, and identify additional contact information that is located near the email address. Information located near the email address may not be associated with the same entity, in which case the indexer 130 can analyze the frequency and/or proximity of occurrence of contact information near the email address. For example, the most commonly occurring phone number within 10 words of the email address. Phone numbers occurring closer to the email address may be given higher weight.

If contact information is determined, in 308 the contact information can be indexed. In one embodiment, contact information associated with an entity name can be associated with the corresponding entity ID in a contact index. The contact index can be stored in the index 142. The contact index can contain entity names and corresponding entity IDs. In one embodiment, the contact information is indexed when the entity name is associated with the user. For example, based on past activity of the user, the indexer 130 can determine if the identified entity is associated with or known to the user. In another embodiment, the indexer 130 can provide notification to the user of the identified entity name and contact information and request authorization from the user to index the contact information.

In 310, the contact information is stored. In one embodiment, the contact information can be stored in the database 144. The contact information can be stored according to a contact schema. The contact schema can allow contact information to be associated with particular types of contact information. For example, the contact schema can include email address, instant messenger address, physical address, URL, and telephone number for an entity. The contact information can be associated with the entity name by association with the corresponding entity ID.

The indexing and storing of contact information associated with entity names can allow later retrieval of this information. For example, in response to an explicit or implicit query relating to an entity name, the query system 132 can identify the contact information stored in the database 144. The identified contact information can be returned in a result set in response to the query. In another embodiment, contact information can be shown on regular search results or associated with events, i.e. the user does not need to explicitly search for contact information. For example, search results may contain an email, and other identified contact information can be displayed along with the email result (address, phone number, etc.). Alternatively, the user 112a can select a search result and the display system then shows event details such as the email content and header information. Along with the event information the display system may show contact information identified as related to the email addresses/names in the To/From/CC: sections of the email.

When search results or events are displayed by the display system, the most likely contact information for people or other entities may be displayed also. In some cases, multiple possible contact information may be displayed. For example, the system might display an event containing an identifier for person Y along with information that person Y's phone number is most likely to be (212) 222 2222, but may also be (212) 111 1111. Each possible contact information may have an associated probability or confidence score indicating how confident the system is that the information is correct. The contact information may not be shown alongside search results or event information, but rather may be make available via links. For example, each identified entity in an event may contain a link to the contact information for that entity. This contact information may also be displayed in a popup or "tooltip" window, when the user moves the mouse over the identifier of the entity.

The environment shown reflects a client-side search engine architecture embodiment. Other embodiments are possible, such as a stand alone client device or a network search engine.

While the above description contains many specifics, these specifics should not be construed as limitations on the scope of the invention, but merely as exemplifications of the disclosed embodiments. Those skilled in the art will envision many other possible variations that are within the scope of the invention.

The invention claimed is:

1. A method comprising:
    identifying an entity name from an event associated with an article, wherein the entity name is associated with an entity and the event is associated with a user;
    identifying contact information from multiple events, the contact information related to the entity name;
    associating the contact information from multiple events with the entity name;
    determining a probability that the contact information is correctly associated with the entity name;
    associating an entity ID with the entity name;
    indexing the entity name and at least some of the contact information based on the entity ID;
    storing the entity name, the probability that the contact information is correctly associated, and at least some of the contact information;
    receiving a search query relating to the entity name;
    identifying at least some of the contact information associated with the entity name as relevant to the query; and
    outputting at least some of the contact information associated with the entity name.

2. The method of claim 1, further comprising causing an output of at least one selected from the group consisting of possible alternative contact information and a probability that the contact information is correctly associated.

3. A method, comprising:
    identifying an entity name from an event associated with an article;
    identifying contact information from multiple events, the contact information related to the entity name;

associating the contact information from multiple events with the entity name;

determining a probability that the contact information is correctly associated with the entity name; and storing the entity name, the probability that the contact information is correctly associated, and at least some of the contact information.

4. The method of claim 3, further comprising associating an entity ID with the entity name.

5. The method of claim 4, wherein the entity ID is the same as the entity name.

6. The method of claim 4, wherein the entity ID is a preexisting entity ID if the entity name has previously been identified.

7. The method of claim 3, wherein the article is associated with a client application.

8. The method of claim 7, wherein the article comprises one selected from the group consisting of an email, a word processing document, a spreadsheet document, a drawing, a programming application document, a presentation application document, a web page, an mp3, an image, and a media file document.

9. The method of claim 3, wherein the contact information comprises one or more selected from the group consisting of one or more names, one or more addresses, one or more telephone numbers, one or more facsimile numbers, one or more email addresses, and one or more website addresses.

10. The method of claim 3, further comprising:

receiving a search query relating to the entity name;

identifying at least some of the contact information as relevant to the query; and outputting at least some of the contact information.

11. The method of claim 3, wherein the probability is determined based at least in part on a frequency of the contact information within the multiple events.

12. The method of claim 11, wherein associating contact information from multiple events with the entity name comprises determining at least one common identifier.

13. The method of claim 12, wherein less than all of the multiple events share a same common identifier.

14. The method of claim 11 wherein associating contact information from multiple events with the entity name comprises determining patterns.

15. The method of claim 11 wherein associating contact information from multiple events with the entity name comprises determining redundant identifiers.

16. The method of claim 3, wherein the probability is determined based at least in part on a proximity of contact information within the multiple events to the entity name.

17. The method of claim 3, wherein identifying the entity name comprises one or more selected from the group consisting of: determining a list, determining a capital letter, determining a field, determining formatting, determining a typical value, and parsing encoded information.

18. The method of claim 3, wherein identifying contact information further comprises determining one or more selected from the group consisting of a field, header tag, context in which text appears, matching entries, and parsed article content.

19. The method of claim 3, further comprising:

causing an output of at least some of the contact information in connection with one or more selected from the group consisting of an article, a link, a search result, and an event.

20. The method of claim 19, further comprising:

causing an output of at least one selected from the group consisting of possible alternative contact information and the probability that the contact information is correctly associated.

21. The method of claim 3, wherein storing the entity name and at least some of the contact information associated with the entity name comprises indexing the entity name and at least some of the contact information associated with the entity name.

22. The method of claim 21, wherein the contact information is indexed if the entity name is associated with a user.

23. The method of claim 22, wherein the entity name is identified as being associated with the user based at least in part on user activity.

24. The method of claim 22, wherein the contact information is indexed if the user provides authorization.

25. A computer-readable medium containing program code comprising:

program code for identifying an entity name from an event associated with an article;

program code for identifying contact information from multiple events, the contact information related to the entity name;

program code for associating the contact information from multiple events with the entity name;

program code for determining a probability that the contact information is correctly associated with the entity name; and program code for storing the entity name, the probability that the contact information is correctly associated, and at least some of the contact information.

26. The computer-readable medium of claim 25, further comprising associating an entity ID with the entity name.

27. The computer-readable medium of claim 26, wherein the entity ID is the same as the entity name.

28. The computer-readable medium of claim 26, wherein the entity ID is a preexisting entity ID if the entity name has previously been identified.

29. The computer-readable medium of claim 25, wherein the article is associated with a client application.

30. The computer-readable medium of claim 29, wherein the article comprises one selected from the group consisting of an email, a word processing document, a spreadsheet document, a drawing, a programming application document, a presentation application document, a web page, an mp3, an image, and a media file document.

31. The computer-readable medium of claim 25, wherein the contact information comprises one or more selected from the group consisting of one or more names, one or more addresses, one or more telephone numbers, one or more facsimile numbers, one or more email addresses, and one or more website addresses.

32. The computer-readable medium of claim 25, further comprising:

program code for receiving a search query relating to the entity name;

program code for identifying at least some of the contact information as relevant to the query; and program code for outputting at least some of the contact information.

33. The computer-readable medium of claim 25, wherein the probability is determined based at least in part on a frequency of the contact information within the multiple events.

34. The computer-readable medium of claim 33, wherein associating contact information from multiple events with the entity name comprises determining at least one common identifier.

35. The computer-readable medium of claim 34, wherein less than all of the multiple events share a same common identifier.

36. The computer-readable medium of claim 33 wherein associating contact information from multiple events with the entity name comprises determining patterns.

37. The computer-readable medium of claim 33 wherein associating contact information from multiple events with the entity name comprises determining redundant identifiers.

38. The computer-readable medium of claim 25, wherein the probability is determined based at least in part on a proximity of contact information within the multiple events to the entity name.

39. The computer-readable medium of claim 25, wherein identifying the entity name comprises one or more selected from the group consisting of: determining a list, determining a capital letter, determining a field, determining formatting, determining a typical value, and parsing encoded information.

40. The computer-readable medium of claim 25, wherein identifying contact information further comprises determining one or more selected from the group consisting of a field, header tag, context in which text appears, matching entries, and parsed article content.

41. The computer-readable medium of claim 25, further comprising:
program code for causing an output of at least some of the contact information in connection with one or more selected from the group consisting of an article, a link, a search result, and an event.

42. The computer-readable medium of claim 41, further comprising:
program code for causing an output of at least one selected from the group consisting of possible alternative contact information and the probability that the contact information is correctly associated.

43. The computer-readable medium of claim 25, wherein storing the entity name and at least some of the contact information associated with the entity name comprises indexing the entity name and at least some of the contact information associated with the entity name.

44. The computer-readable medium of claim 43, wherein the contact information is indexed if the entity name is associated with a user.

45. The computer-readable medium of claim 44, wherein the entity name is identified as being associated with the user based at least in part on user activity.

46. The computer-readable medium of claim 44, wherein the contact information is indexed if the user provides authorization.

* * * * *